(12) United States Patent
Walton

(10) Patent No.: US 8,599,767 B2
(45) Date of Patent: Dec. 3, 2013

(54) METHOD AND APPARATUS FOR SCANNING MULTI-MODE WIRELESS COMMUNICATION ENVIRONMENTS

(75) Inventor: Kevin Walton, Vancouver (CA)

(73) Assignee: NETGEAR, Inc., San Jose, CA (US)

(*) Notice: Subject to any disclaimer, the term of this patent is extended or adjusted under 35 U.S.C. 154(b) by 754 days.

(21) Appl. No.: 12/433,548

(22) Filed: Apr. 30, 2009

(65) Prior Publication Data

US 2009/0323609 A1    Dec. 31, 2009

Related U.S. Application Data

(60) Provisional application No. 61/076,095, filed on Jun. 26, 2008.

(51) Int. Cl.
  *H04W 4/00* (2009.01)

(52) U.S. Cl.
  USPC ............ 370/329; 370/338; 370/341; 370/348

(58) Field of Classification Search
  USPC ............ 370/329, 330, 341, 348, 331; 455/62, 455/161, 1, 434, 435
  See application file for complete search history.

(56) References Cited

U.S. PATENT DOCUMENTS

| | | | |
|---|---|---|---|
| 4,833,701 A | 5/1989 | Comroe | |
| 4,916,728 A | 4/1990 | Blair | |
| 5,150,362 A | 9/1992 | Akerberg | |
| 5,327,578 A | 7/1994 | Breeden | |
| 5,428,666 A | 6/1995 | Fyfe | |
| 5,517,677 A | 5/1996 | Moon | |
| 5,524,280 A * | 6/1996 | Douthitt et al. | 455/62 |
| 5,537,460 A | 7/1996 | Holiday, Jr. | |
| 5,586,338 A | 12/1996 | Lynch | |
| 5,603,090 A | 2/1997 | Nguyen | |

(Continued)

FOREIGN PATENT DOCUMENTS

| | | |
|---|---|---|
| WO | 00/37889 | 6/2000 |
| WO | 00/78075 | 12/2000 |

OTHER PUBLICATIONS

GSM 05.08 version 6.3.0, Release 1997, "Digital cellular telecommunications system (Phase 2+) (GSM); Radio subsystem link control", European Telecommunications Standards Institute, Nov. 1998.

(Continued)

*Primary Examiner* — Brian D Nguyen
*Assistant Examiner* — Toan Nguyen
(74) *Attorney, Agent, or Firm* — Boyle Fredrickson, S.C.

(57) ABSTRACT

The present invention provides a method and apparatus for adaptively scanning communication channels to find a channel having a desired attribute such as being usable for communication with a home network in one of a plurality of communication modes. A first scan of a first set of channels is performed, and attributes are assigned to channels. If a channel having the desired attribute is not found, the attributes are used to configure a second scan of a second set of channels using a second scan mode, such that the expected amount of resources consumed in the second scan is reduced, for example by scanning channels more likely to be usable for communication first. The second scan of a second set of channels is performed, and additional attributes are assigned to channels. If a channel having the desired attribute is found during the first or second scan, the scan may terminate.

34 Claims, 7 Drawing Sheets

(56) References Cited

U.S. PATENT DOCUMENTS

| | | | |
|---|---|---|---|
| 5,732,348 A | 3/1998 | Norimatsu | |
| 5,784,693 A | 7/1998 | Barber | |
| 5,794,148 A * | 8/1998 | Mamaghani et al. | 455/435.3 |
| 5,799,241 A | 8/1998 | Matsubara | |
| 5,809,419 A | 9/1998 | Schellinger | |
| 5,815,811 A | 9/1998 | Pinard | |
| 5,832,367 A | 11/1998 | Bamburak | |
| 5,924,026 A | 7/1999 | Krishnan | |
| 6,014,557 A | 1/2000 | Morton | |
| 6,044,265 A | 3/2000 | Roach, Jr. | |
| 6,052,590 A | 4/2000 | Hicks | |
| 6,085,087 A | 7/2000 | Hori | |
| 6,094,581 A | 7/2000 | Fried | |
| 6,119,003 A | 9/2000 | Kukkohovi | |
| 6,148,198 A | 11/2000 | Anderson | |
| 6,185,423 B1 | 2/2001 | Brown | |
| 6,192,223 B1 | 2/2001 | Barnett | |
| 6,324,400 B1 | 11/2001 | Shah | |
| 6,415,148 B1 | 7/2002 | Chiniga | |
| 6,516,188 B1 | 2/2003 | New | |
| 6,584,311 B1 | 6/2003 | Sorenson | |
| 6,591,100 B1 | 7/2003 | Dent | |
| 6,600,922 B1 | 7/2003 | Aoki | |
| 6,615,043 B1 * | 9/2003 | van de Berg | 455/434 |
| 6,754,491 B2 | 6/2004 | Konno | |
| 6,778,827 B1 | 8/2004 | Anderson | |
| 6,804,529 B1 | 10/2004 | Barnes | |
| 6,810,251 B2 | 10/2004 | Hassan | |
| 6,941,120 B2 | 9/2005 | Barnett | |
| 6,950,676 B2 | 9/2005 | Sumino | |
| 6,999,768 B2 | 2/2006 | Iizuka | |
| 7,062,271 B2 | 6/2006 | Choi | |
| 7,065,351 B2 | 6/2006 | Carter | |
| 7,123,912 B2 | 10/2006 | Kim | |
| 7,164,920 B2 | 1/2007 | Giacalone | |
| 7,260,393 B2 | 8/2007 | Fnu | |
| 2001/0027118 A1 | 10/2001 | Sumino | |
| 2002/0082010 A1 * | 6/2002 | Koorapaty et al. | 455/434 |
| 2002/0102973 A1 | 8/2002 | Rosenberg | |
| 2002/0164983 A1 | 11/2002 | Raviv | |
| 2002/0168976 A1 | 11/2002 | Krishnan | |
| 2003/0022670 A1 | 1/2003 | Hassan | |
| 2003/0040311 A1 | 2/2003 | Choi | |
| 2003/0186695 A1 | 10/2003 | Bridges | |
| 2004/0043767 A1 | 3/2004 | Tsutsumi | |
| 2004/0063427 A1 | 4/2004 | Narashima | |
| 2004/0087305 A1 | 5/2004 | Jiang | |
| 2004/0087309 A1 | 5/2004 | Joshi | |
| 2004/0166864 A1 | 8/2004 | Hill | |
| 2004/0192328 A1 | 9/2004 | Giacalone | |
| 2004/0203745 A1 | 10/2004 | Cooper | |
| 2004/0219916 A1 | 11/2004 | Kim | |
| 2005/0037753 A1 | 2/2005 | Andersen | |
| 2005/0282544 A1 | 12/2005 | Oommen | |
| 2006/0068778 A1 | 3/2006 | Della-Torre | |
| 2006/0079224 A1 | 4/2006 | Welnick | |
| 2006/0105791 A1 | 5/2006 | Ginzburg | |
| 2006/0199586 A1 | 9/2006 | Yoon | |
| 2006/0286978 A1 | 12/2006 | Jiang | |
| 2007/0025293 A1 | 2/2007 | Choi | |
| 2007/0254612 A1 * | 11/2007 | Simmons et al. | 455/161.1 |
| 2007/0254649 A1 * | 11/2007 | Klein et al. | 455/434 |
| 2008/0075035 A1 | 3/2008 | Eichenberger | |
| 2008/0096501 A1 * | 4/2008 | Salomone et al. | 455/161.1 |
| 2009/0003278 A1 * | 1/2009 | Abdel-Kader et al. | 370/331 |

OTHER PUBLICATIONS

Boone, et al., "Strategies for Fast Scanning and Handovers in WiMax/802.16", Proceedings of the Second International Conference on Access Networks and Workshops, Aug. 2007.

* cited by examiner

METHOD AND APPARATUS FOR SCANNING MULTI-MODE WIRELESS COMMUNICATION ENVIRONMENTS

CROSS REFERENCE TO RELATED APPLICATIONS

The present application claims priority under 35 U.S.C. §119 to U.S. Provisional Application Ser. No. 61/076,095, filed Jun. 26, 2008, entitled SCAN METHOD AND APPARATUS FOR MULTI-MODE WIRELESS COMMUNICATION ENVIRONMENTS, the disclosure of which is incorporated herein by reference.

FIELD OF THE INVENTION

The present invention pertains in general to wireless or radio communications systems and in particular to a method and apparatus for scanning frequencies to identify an available communications channel in a wireless network.

BACKGROUND

In an open, wireless communications network such as a cellular telephone network, a communication terminal seeking to join the network may not initially know which logical communication channels can be used to communicate with other communication terminals or base stations within the network. Joining the network, therefore, can require a potentially extensive channel search or scan which can consume significant time and energy resources.

To reduce the expected time and energy resources dedicated to channel scanning activities, several solutions have been proposed which attempt to leverage known information to reduce the number of scans performed by scanning deemed more likely channel candidates earlier or more frequently than deemed less likely candidates.

U.S. Pat. No. 5,517,677 discloses a channel scanning technique that is preferential to communication channels actually utilized in the past. A scanning cycle of channels or frequencies to be scanned is defined, in which preferred frequencies are scanned multiple times early in the cycle. When a scanned frequency is revealed to be functional for connecting to a desired wireless network, the cycle is redefined, so that this scanned frequency will be scanned more often in the future. Geographic location can also be used to influence the scanning cycle.

United States Patent Application Publication No. US 2007/0254649 similarly discloses an adaptive scanning method in which an initial list of channels to be scanned is updated by temporarily "marking" channels having qualified activity, such that these marked channels are scanned at a higher periodic rate for a predetermined number of scan cycles.

U.S. Pat. Nos. 6,192,223 and 6,941,120 both disclose a frequency scanning radio receiver which updates a scanning list based on geographical information, for example as collected by the communications terminal via a Global Positioning System. Geographical information is used to look up a database of frequency allocation data, which provides a list of preferred scanning frequencies.

International Patent Application Publication No. WO 00/78075 discloses a method of scanning sub-carrier frequencies in which sets of frequencies are scanned in order based on a perceived likelihood of successful use. The first set of frequencies scanned corresponds to a stored list of frequencies known to be in use without regard to operator identity or geographic location. Additional sets of frequencies may then be scanned in turn, wherein lists of frequencies with perceived higher likelihood of successful use are scanned first. A combination of predefined and updatable lists is also disclosed, wherein lists may be updated based on the history of successful network connections.

Recently, flexible communications terminals, such as multi-mode cellular telephones, have been introduced which allow for connection to different types of wireless networks with a single device. For example, dual-mode cellular handsets are available which can connect to either a GSM (Global System for Mobile Communication) or UMTS (Universal Mobile Telecommunications System) network, depending on availability. When such a flexible terminal seeks to join a network, it must not only scan for an available channel, but must also scan for an available network type. Since different communication modes can rely on substantially different technologies, scans for networks operating in each mode may require substantially different operations.

Conventional single-mode adaptive scanning solutions, such as described above, do not account for the potential multi-mode operation of flexible communications terminals. As such, a flexible communications terminal such as a multi-mode cellular handset would be required to perform multiple, independent single-mode scans in order to find a desired communication network operating on an unknown channel and in an unknown mode. This can be inefficient in terms of scan time and energy usage since information gathered during a channel scan for networks operating in one mode is not used during subsequent channel scans for networks operating in other modes.

Therefore, there is a need for a method of scanning a network that scans for networks in multiple communication modes and adapts scan behaviour based on the results of previous scans.

SUMMARY OF THE INVENTION

An object of the present invention is to provide a method and apparatus for scanning multi-mode wireless environments. In accordance with an aspect of the present invention, there is provided a method of scanning a plurality of communication channels and identifying one or more communication channels having a desired attribute, the method comprising: performing a first scan of a first set of at least one of the plurality of communication channels using a first scan mode; assigning one or more attributes to at least one of the plurality of communication channels depending on the first scan, the one or more attributes selected from a set of potential attributes including the desired attribute; determining, based on the assigned attributes, whether to perform a second scan of at least one of the plurality of communication channels using a second scan mode; performing, if required, said second scan, the second scan configured based at least in part on the assigned attributes; assigning one or more additional attributes to at least one of the plurality of communication channels depending on the second scan, the one or more additional attributes selected from the set of potential attributes including the desired attribute; and identifying at least one of said one or more of the plurality of communication channels having the desired attribute if one or more of the plurality of communication channels are assigned the desired attribute based on the first scan or the second scan.

In accordance with another aspect of the present invention, there is provided a method of scanning a plurality of communication channels to identify one or more communication channels having a desired attribute, the method comprising scanning one or more of the plurality of communication channels using two or more scan modes, wherein information acquired during one scan mode is used to configure a subsequent scan mode.

In accordance with another aspect of the present invention, there is provided an apparatus for scanning a plurality of communication channels and identifying one or more communication channels having a desired attribute, the apparatus comprising: a first scanning module configured to perform a first scan of a first set of at least one of the plurality of communication channels using a first scan mode; a second scanning module configured to perform a second scan of a second set of at least one of the plurality of communication channels using a second scan mode; and a processing module configured to: initiate the first scanning module to perform the first scan, the processing module configured to assign one or more attributes to at least one of the plurality of communication channels depending on the first scan, the one or more attributes selected from a set of potential attributes including the desired attribute; determine, based on the assigned attributes, whether to perform the second scan; initiate, if required, the second scanning module to perform the second scan; configure the second scan based at least in part on the assigned attributes; assign one or more additional attributes to at least one of the plurality of communication channels depending on the second scan, the one or more additional attributes selected from the set of potential attributes including the desired attribute; and identify at least one of said one or more of the plurality of communication channels having the desired attribute if one or more of the plurality of communication channels are assigned the desired attribute based on the first scan or the second scan.

In accordance with another aspect of the present invention, there is provided an apparatus for scanning a plurality of communication channels to identify one or more communication channels having a desired attribute, the apparatus configured to scan one or more of the plurality of communication channels using two or more scan modes, wherein information acquired during one scan mode is used to configure a subsequent scan mode.

In accordance with another aspect of the present invention, there is provided a computer readable medium having recorded thereon statements and instructions for execution by a computer to carry out a method of scanning a plurality of communication channels and identifying one or more communication channels having a desired attribute, the method comprising: performing a first scan of a first set of at least one of the plurality of communication channels using a first scan mode; assigning one or more attributes to at least one of the plurality of communication channels depending on the first scan, the one or more attributes selected from a set of potential attributes including the desired attribute; determining, based on the assigned attributes, whether to perform a second scan of at least one of the plurality of communication channels using a second scan mode; performing, if required, said second scan, the second scan configured based at least in part on the assigned attributes; assigning one or more additional attributes to at least one of the plurality of communication channels depending on the second scan, the one or more additional attributes selected from the set of potential attributes including the desired attribute; and identifying at least one of said one or more of the plurality of communication channels having the desired attribute if one or more of the plurality of communication channels are assigned the desired attribute based on the first scan or the second scan.

In accordance with another aspect of the present invention, there is provided a computer readable medium having recorded thereon statements and instructions for execution by a computer to carry out a method of scanning a plurality of communication channels to identify one or more communication channels having a desired attribute, the method comprising scanning one or more of the plurality of communication channels using two or more scan modes, wherein information acquired during one scan mode is used to configure a subsequent scan mode.

DETAILED DESCRIPTION OF THE INVENTION

Definitions

Figure 1:
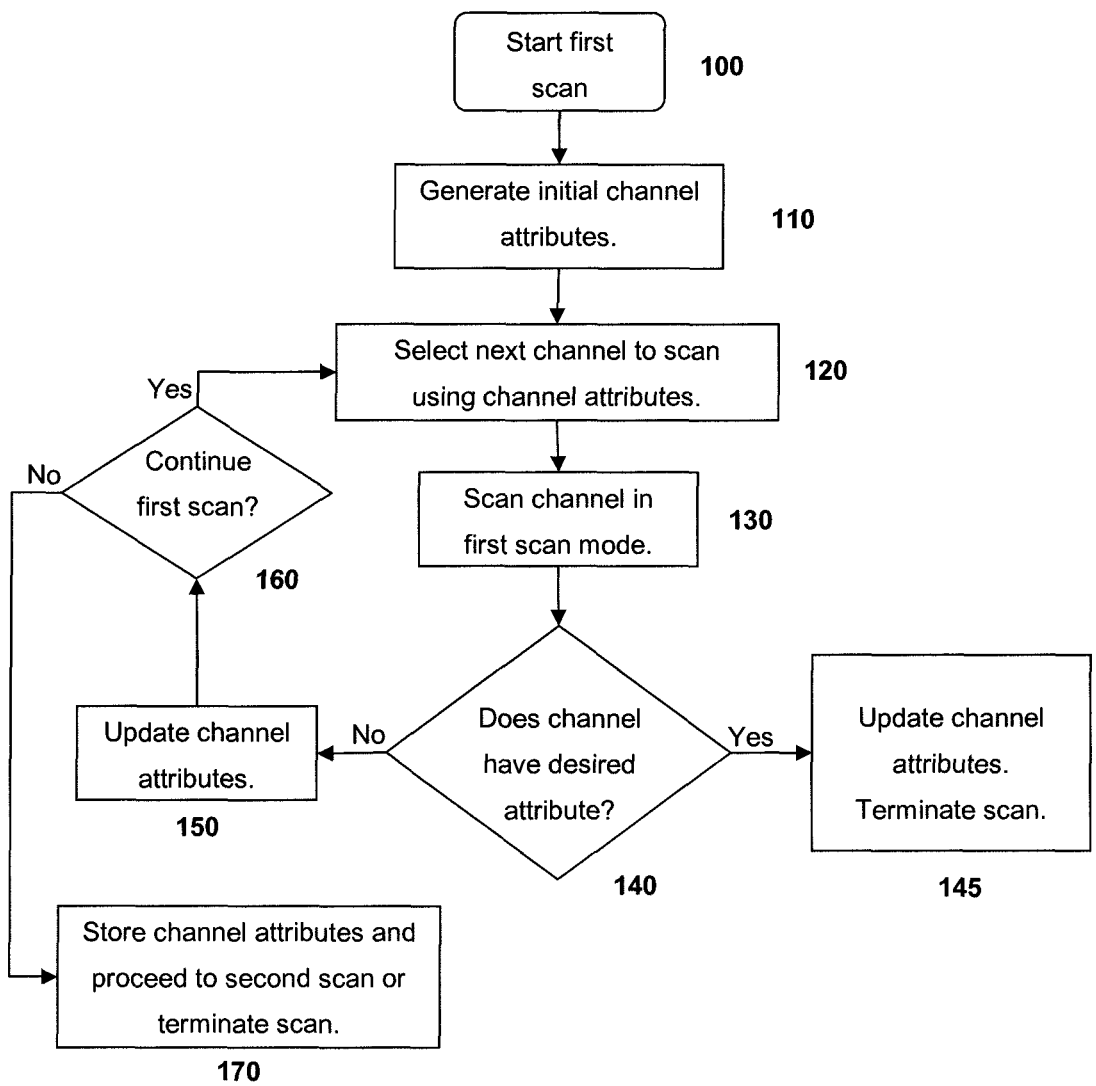
FIG. 1 illustrates a method for executing a first scan for a network operating in a first mode according to one embodiment of the present invention.

The terms "communication channel" and "channel" are interchangeably used herein to refer to a medium or potential medium for conveying information between one or more senders and one or more receivers. In the case of wireless communications, a communication channel comprises a radio frequency or collection or interval of radio frequencies such as one or more frequency bands. As would be understood by a worker skilled in the art, a communication channel can be shared or used for multiple concurrent information conveyances between different senders and receivers, for example by using one or more multiple access or multiplexing methods. For example, approaches such as FDMA (frequency division multiple access), TDMA (time division multiple access), CDMA (code division multiple access), WCDMA (wideband code division multiple access), CSMA (carrier sense multiple access), OFDMA (orthogonal frequency division multiple access), FHSS (frequency hopping spread spectrum) and the like, can be employed to facilitate channel sharing. Spectrum sharing rules such as FCC rules can be employed to facilitate the existence of multiple concurrent radio communication channels while maintaining acceptable levels of interference. It is contemplated that different communication channels do not necessarily comprise mutually exclusive radio frequencies, although it is possible to define separate channels based on separate radio frequencies. Multiple channels can exist concurrently in which different channels comprise at least partially overlapping radio frequencies, while maintaining an acceptable level of interference between channels, as would be understood in the art. For example, time sharing, spatial re-use, beamforming, spreading codes (for example as used in ultra-wideband communication) or the like can be used to separate channels on bases other than or in addition to frequency separation.

The term "nearby channel," or other term indicating relative channel distance, are interchangeably used to refer to a measure of distance between two channels, as determined in part by the communication protocols in effect. For example, for radio communication channels, two channels may be deemed to be nearby if frequencies used thereby, such as their center frequencies or 3 dB cutoff frequencies, differ by less than a predetermined threshold. For some types of spread spectrum channels, two channels may be deemed to be nearby if their spreading codes are substantially non-orthogonal. In addition, based on the above, a worker skilled in the art would readily understand what would be deemed to be a nearby channel, or what would be an appropriate measure of channel distance. As another example, two channels may be deemed to be nearby if substantial efforts (such as related to carrier frequency selection, modulation, bandwidth, location, beamforming, power and/or timing parameters or spreading code choice) are typically taken to ensure that communication activity on one channel does not cause substantial interference on the other channel. The amount of such effort, measured in a manner as would be understood by a worker skilled in the art, can be deemed to be a distance, as can related measures such as channel mutual information, signal to interference ratio, and the like.

The term "communication terminal" is used to refer to a device capable of communicating over a communication channel. For example, in the case of a wireless cellular network, a communication terminal can be a telephone handset, mobile computing device, embedded communication device, radio transceiver, or other similar device as would be readily understood by a worker skilled in the art. A communication terminal can also refer to a base station such as a cellular communication tower, or the like.

The term "network" refers to a system of communication terminals connected or reachable via one or more communication channels in a geographic area. For example, a (wireless) network can be a cellular network operated by a cellular service provider, a wireless local area network, campus area network, metropolitan area network, or wide area network, or the like. A communication terminal can connect to a network, possibly subject to authentication or compatibility, by connecting to one or more communication channels associated with the network. Networks can be used for various communications purposes such as voice, video, data transfer, or the like. Furthermore, a public land mobile network (PLMN), or the like, can also be considered a network.

The term "home network" refers to a particular network to which a particular communication terminal seeks to connect, or to which the terminal is authorized to connect. For example, a home network can be a network operated by a primary service provider for example for a cellular customer, a network operated by another service provider having a roaming agreement with the primary service provider, or the like. Furthermore, a home public land mobile network (HPLMN), or the like, can also be considered a home network.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a method of scanning a plurality of communication channels in order to identify one or more communication channels having a desired attribute, the attributes pertaining to multiple communication modes or protocols. For example, a desired attribute might be that a channel is useful for communication with a home network using one of a predetermined set of communication modes. The scanning method comprises performing a first scan of a first set of at least one of the plurality of communication channels using a first scan mode, and assigning one or more attributes to at least one of the plurality of communication channels depending on the first scan. The assigned attributes can be the desired attribute, or other information pertaining to observed or inferred radio activity on the channels. For example, if, based on the first scan, one or more of the plurality of communication channels are assigned the desired attribute, at least one of these particular channels may be identified as such. The method also provides for determining, based on the assigned attributes, whether to perform a second scan. For example, if, based on the first scan, none of the plurality of communication channels are assigned the desired attribute, the method provides for performing a second scan of a second set of at least one of the plurality of communication channels using a second scan mode. The second scan is configured depending on the assigned attributes, such as one or more attributes which are assigned based on the first scan. This allows information obtained during the first scan to be used to improve the use of resources during the second scan. Based on the second scan, one or more additional attributes are assigned to at least one of the plurality of communication channels. If one or more of the plurality of communication channels are assigned the desired attribute based on the second scan, at least one of these particular channels are identified as having the desired attribute.

The present invention also provides for an apparatus for scanning a plurality of communication channels, in order to identify one or more communication channels having a desired attribute. The apparatus comprises a first scanning module configured to perform a first scan of a first set of at least one of the plurality of communication channels using a first scan mode. For example, a programmable radio scanner or the like. The apparatus further comprises a second scanning module configured to perform a second scan of a second set of at least one of the plurality of communication channels using a second scan mode. Optionally, a single scanning device, such as a programmable radio scanner, can be provided which provides functionality of both the first scanning module and the second scanning module. The apparatus also comprises a processing module which, when a scan is required, is configured to initiate the first scanning module to perform the first scan. Depending on the first scan, the processing module is configured to assign one or more attributes to at least one of the plurality of communication channels. If one or more communication channels are assigned the desired attribute based on the first scan, the processing module is further configured to identify at least one of these channels. If required, for example if no communication channel is assigned the desired attribute based on the first scan, the processing module is further configured to initiate the second scanning module to perform the second scan, wherein information obtained during the first scan can be used to improve the use of resources during the second scan. As such, the processing module is configured to configure the second scan depending on the attributes assigned based on the first scan. The processing module is further configured to assign one or more additional attributes to at least one of the plurality of communication channels depending on the second scan, and to identify at least one communication channel having the desired attribute if one or more of the plurality of communication channels are assigned the desired attribute based on the second scan.

In one embodiment, the present invention provides a method of identifying, out of a plurality of channels, a channel usable for communication in a first mode or a second mode. The method comprises using a first scan mode to scan at least one of the plurality of communication channels. The first scan mode is capable of identifying a channel usable for communication in the first mode, and is further capable of determining at least one higher priority channel more likely to be usable for communication in the second mode than at least one lower priority channel if no such usable channel is identified. If a channel usable for communication in the first mode is not identified, the method provides for a second scan mode for scanning at least one of the plurality of communication channels. The second scan mode is capable of identifying a channel usable for communication in the second mode, and is configured to scan at least one higher priority channel before at least one lower priority channel, as determined at least in part by the first scan mode. Optionally, at least one lower priority channel is not scanned in the second scan mode if it is deemed sufficiently unlikely that such a channel will not be usable for communication in the second mode.

In one embodiment, the present invention provides a method and apparatus for scanning communication channels, wherein as scanning progresses, information acquired over the duration of scanning is used to configure further multi-mode scanning.

First Scan

The present invention involves conducting a first scan of one or more communication channels to determine one or more attributes of the scanned channels and optionally of channels related to the scanned channels. The first scan includes scanning channels in a first scan mode, the first scan mode directed in part toward assigning one or more attributes to communication channels. For example, attributes assigned by the first scan can include whether or not a particular channel is usable in the first communication mode. Further attributes, useful for configuring the first scan and other scans such as the second scan, can also be determined from the first scan, as described below.

In one embodiment, the first scan mode provides an operation for determining the network activity or power on one or more channels. This operation can involve detecting the amount of radio activity on one or more channels, or at one or more prespecified frequencies such as can indicate a high level of activity on a communication channel of a predetermined type. For example, the amount of radio activity can be determined by detecting the total power of radiation in a frequency band, or by another appropriate manner as would be readily understood by a worker skilled in the art.

The amount of radio activity on a frequency range or collection of frequency ranges can be substantially independent of the type of network potentially operating on said frequencies. Therefore, the amount of radio activity can indicate the presence of a network without determining the mode of operation or type of network. This can be advantageous since the information regarding radio activity can be used when scanning for one or more of a variety of types of network. Therefore, the amount of radio activity on a channel can be related to an attribute usable for configuration of the first scan, the second scan, or both, and may optionally be used for configuration of a subsequent scan.

In one embodiment, the first scan mode provides an operation for determining whether one or more channels are associated with a network operating in a first mode. For example, channels determined to have high network activity or power may be further probed during this operation to determine whether they are associated with a network operating in the first mode, as would be understood by a worker skilled in the art. An attribute indicating whether or not a channel is operating in the first mode can be useful in configuring the first scan mode and the second scan mode. For example, in the first scan mode, a channel having such an attribute can be further probed to determine whether the network is a home network. In the second scan, the channel can be avoided or scanned with low priority since it may be unlikely that the channel is used by two networks simultaneously.

In one embodiment, the first scan mode provides an operation for determining whether one or more channels are associated with a home network operating in a first mode. For example, channels determined to be associated with a network operating in a first mode may be further probed during this operation to determine whether they are associated with a home network operating in the first mode, as would be understood by a worker skilled in the art. An attribute indicating whether the channel is associated with a home network operating in the first mode can be assigned according to this determination. In one embodiment, this is the desired attribute sought by the scanning method or apparatus. In one embodiment, the first scan can be terminated if a home network is found, allowing for timely connection to the home network.

In one embodiment, the first scan mode provides an operation for determining a usage level of a channel, and consequently the feasibility of sharing the channel with other users. For example, a channel shared by a multiple access scheme such as TDMA, CDMA or FDMA can in some instances be highly utilized, for example by a large number of users near the capacity limit for that channel, thus leaving little room for a new connection and reducing the likelihood that the channel is usable for communication. In other instances, the channel may not yet be at capacity, thus increasing the feasibility for using the channel for communication. Determining the utilization of a channel supporting multiple access can be performed either by directly observing communication on the channel or by querying one or more communication terminals associated with the channel.

In one embodiment, further attributes can also be assigned to one or more channels in the first scan mode. For example, a channel can be assigned an attribute indicating that a nearby, or otherwise associated, channel has a certain level of network activity or power, or is associated with a network or home network operating in the first mode. In this manner, clusters of channels having certain characteristics can be identified, and subsequently avoided or analyzed during additional scans.

In one embodiment, other channel attributes can be assigned in the first scan mode, such as attributes which can be functions of the channel attributes described above. For example, a "channel score" or "probability score" attribute can be assigned which assigns a value to a channel indicative of the likelihood that the channel can be used to connect to a home network in a first mode or a second mode. Alternatively, attributes indicating the priority or order in which channels are to be scanned using one or more scan modes can be assigned. These attributes can be assigned to a channel as a deterministic or random function of the other attributes above, such as the level of power of the channel or nearby channels, or the status of any networks operating on the channel or nearby channels. Other information, such as the current status of a scan, or geographic information can also influence the assignment of attributes.

In one embodiment, the first scan is an adaptive scan. For example the identification and ordering of channels to be scanned can be altered as the first scan progresses, according to the results and attributes observed so far.

In one embodiment, the first scan mode involves searching for a GSM network by observing one or more radio frequencies or channels in a commonly used GSM frequency band. For example, in North America, GSM operating bands include the G850 and G1900 bands, operating in frequency ranges of 824-894 MHz and 1850-1990 MHz, respectively. The first scan mode can involve a preliminary determination of the radio environment by sampling radio activity on frequencies within these ranges. Frequencies or channels with radio activity of a type indicating a possible GSM network can then be further probed to determine if a GSM network is accessible on that channel, and if so whether it is a home GSM network, or HPLMN.

In one embodiment, a first scan using the first scan mode for a GSM network can be used to configure a possible second scan for a UMTS network. This is possible since GSM and UMTS networks can operate on overlapping frequency ranges. For example, in North America, UMTS networks commonly use a WCDMA radio interface operating in the W850 and W1900 bands, operating in frequency ranges of 824-894 MHz and 1850-1990 MHz, respectively. These frequency ranges overlap with the G850 and G1900 GSM operating bands described above. Therefore, information about the radio environment acquired during the first scan, for example the amount of radio activity in one or more frequency ranges, and the presence of GSM networks in one or more frequency ranges, can be used to prioritize or de-prioritize frequency scans during a second scan using a second scan mode searching for a UMTS network. In short, information acquired during the first scan for GSM networks can be used to increase the efficiency of a possible second scan for UMTS networks.

Second Scan

The present invention involves conducting a second scan of one or more radio communication channels to determine one or more attributes of the scanned channels and optionally of channels related to the scanned channels. The second scan includes scanning channels in a second scan mode, the second scan mode directed in part toward assigning one or more attributes to communication channels. For example, attributes determined based on the second scan mode can include whether or not a particular channel is usable in the second communication mode. Further attributes, useful for further configuring the second scan and other scans, can also be determined from the second scan, as described below. In addition, the configuration of the second scan, for example influencing which channels to scan in the second scan mode and an initial ordering of said channels, can be based at least in part on attributes assigned during the first scan, as described below.

The results of the first scan can be used in a predetermined manner to influence the second scan. This can focus efforts of the second scan so as to decrease the expected amount of resources required to find a usable communication channel in the second scan. For example, the first scan, while possibly unable to directly determine which channels are usable for communication in the second mode, may nonetheless be capable of obtaining partial information indicating whether a channel is more likely or less likely to be usable for communication in the second mode. In the second scan, therefore, the more likely candidate channels can be scanned earlier than other channels, while the less likely candidate channels can be scanned later or, in one embodiment, not at all.

In one embodiment, the likelihood of a channel being usable for communication in the second mode can be computed based on information gathered in the first scan using conditional probability calculations. For example a Bayesian network, recursive Bayesian estimator, or particle filter can be operated by the communications terminal to calculate the probabilities of one or more channels being usable for communication in the second mode, conditional on observations made in the first scan. These probabilities can be associated with probability score attributes for one or more channels.

In one embodiment, channels with higher probability scores can be scanned earlier during the second scan than channels with lower probability score attributes, thus reducing the expected time and energy expended in the second scan before a home network is found.

In one embodiment, channels with probability score attributes below a predetermined threshold, or channels having probability score attributes lower than the $n^{th}$ lowest probability score, for some predetermined value of n, can be avoided entirely during the second scan.

In one embodiment, the second scan is an adaptive scan, wherein the list and order of channels to be scanned can be altered as the second scan progresses, according to the results and attributes observed so far. In this case, the attributes assigned during the first scan can form initial conditions influencing the second scan. For example, these attributes can influence an initial collection, ordering, or a combination thereof, of channels to be scanned during the second scan, where this initial collection or ordering can change as the second scan progresses and further information is obtained.

In one embodiment, the second scan mode provides an operation for determining whether one or more channels are associated with a network operating in a second mode. For example, channels determined to have high network activity or power may be further probed during this operation to determine whether they are associated with a network operating in the second mode, as would be understood by a worker skilled in the art. An attribute indicating whether or not a channel is operating in the second mode can be useful in configuring the second scan mode and possibly further scans. For example, a channel operating in the second mode can be further probed to determine whether the network is a home network. In further scans, the channel can be avoided or scanned with low priority since it may be unlikely that the channel is used by two networks simultaneously.

In one embodiment, the second scan mode provides an operation for determining whether one or more channels are associated with a home network operating in a second mode. For example, channels determined to be associated with a network operating in a second mode may be further probed during this operation to determine whether they are associated with a home network operating in the second mode, as would be understood by a worker skilled in the art. An attribute indicating whether the channel is associated with a home network operating in the second mode can be assigned according to this determination. In one embodiment, this is the desired attribute sought by the scanning method or apparatus. In one embodiment, the second scan can be terminated if a home network is found, allowing for timely connection to the home network.

In one embodiment, the second scan mode provides an operation for determining a usage level of a channel, and consequently the feasibility of sharing the channel with other users. For example, a channel shared by a multiple access scheme such as TDMA, CDMA or FDMA can in some instances be highly utilized, for example by a large number of users near the capacity limit for that channel, thus leaving little room for a new connection and reducing the likelihood that the channel is usable for communication. In other instances, the channel may not yet be at capacity, thus increasing the feasibility for using the channel for communication. Determining the utilization of a channel supporting multiple access can be performed either by directly observing communication on the channel or by querying one or more communication terminals associated with the channel.

In one embodiment, the second scan mode involves searching for a UMTS network. As discussed above, if the first scan mode involves searching for a GSM network, information relevant to the second scan can be extracted from the first scan results since the GSM and UMTS can potentially operate on overlapping frequency ranges. For example, if a non-home GSM network operating in a first frequency range was detected during the first scan, then it is less likely that the first frequency range, or nearby frequencies, will contain a UMTS network. Therefore, the first frequency range need not be scanned a second time for a UMTS network. Similarly, if radio activity in a second frequency range was detected during the first GSM scan, but no GSM network was found in that frequency range, then it is more likely that the second frequency range, or nearby frequencies, will contain a UMTS network. Therefore, the second frequency range can be scanned sooner during the second scan.

Additional Variations

In one embodiment, a first scan or a second scan is executed by sequentially scanning each channel in a prespecified list until a stopping condition is reached, and assigning one or more attributes to each channel after each channel is scanned. The order of the channels to be scanned is substantially fixed.

In one embodiment, a scan can terminate before the entire list is scanned if a predetermined stopping condition is reached. For example, if a channel usable for communication with a network is found, the scan can terminate. This allows time and energy to be saved if a judicious channel scan sequence can be selected.

In one embodiment, as mentioned above with respect to the first scan and the second scan, a scan can be executed in an adaptive manner. For example, one or more initial conditions for the scan can be given, and an initial channel or collection of channels is selected and scanned according to the initial conditions. Thereafter, the initial conditions and the results of the channel scans performed so far can periodically be used to influence the selection of further channels to be scanned and the order in which the scan is executed. For example, if a scan of one or more adjacent channels reveals the channels being used by a network other than the home network sought in the current scan, other nearby channels deemed likely to also be in use by this network can be skipped by the current scan, since these channels would not typically be expected to be used by the home network being sought. Moreover, common practice in a given area may be to typically separate channels of different networks by a predetermined interval of channels, in which case the adaptive scan can be configured to skip over this predetermined interval or a fraction thereof that is expected to contain unused channels.

In one embodiment, other labels or values can be assigned to channels to facilitate the scanning process, for example in an adaptive scan. Such labels or values can be treated similarly to channel attributes, but are intended to facilitate convenience and flexibility in channel scanning operations, as opposed to reflecting intrinsic properties of the channels themselves. For example, channels that are "to be scanned" in the current scan can be assigned a label indicating so. During the process of a scan, if a channel is determined to be a poor candidate, this "to be scanned" label can then be cleared. As another example, each channel can be assigned one or more values based on the last time the channel was scanned, or the scheduled or expected future time when the channel may next be scanned. Other labels or values can be assigned in order to facilitate sequential or adaptive channel scanning methods for each scan, or for a sequential or adaptive series of scans.

In one embodiment, the first set of channels scanned during the first scan lie in a first frequency range, the second set of channels scanned during the second scan lie in a second frequency range, and the first and second frequency ranges overlap. In this case, in one embodiment, configuration of the second scan based on the results of the first scan can be performed based on the reasoning that predetermined types of communication channels will typically operate on substantially separate frequencies. That is, the discovery of a channel operating in a first mode during the first scan can reduce expectation that a channel operating in a second mode will be discovered at that same frequency during the second scan. Conversely, radio activity at a given frequency, detected during the first scan but not resulting in discovery of a channel during the first scan, may indicate increased likelihood that a channel will be discovered near that frequency during the second scan. This can be due to a logical process of elimination, a probabilistic or stochastic process, or other method, since it is typically assumed that radio activity is indicative of something, and if not a channel detectable by the first scan, perhaps a channel detectable by the second scan.

In one embodiment, the first set of channels scanned during the first scan lie in a first frequency range, the second set of channels scanned during the second scan lie in a second frequency range, and the first and second frequency ranges need not overlap. The second scan can still be based on the results of the first scan, since the first scan results in information which can be interpreted and utilized in a variety of ways. For example, the first scan may indicate an arrangement of channels indicative of a particular geographic location, for which it is known that configuring one or more aspects of the second scan in a predetermined manner will improve performance of the second scan. Similarly, the first scan may yield no results of channels of a given type, for example GSM, which may be indicative of the expectation (for example very low or very high) of discovering another type of channel, for example UMTS, during the second scan.

In one embodiment, execution of the second scan can be conditional on the outcome of the first scan. For example, the second scan may be performed only if a desired attribute is not assigned during the first scan. This allows the scan to terminate once a task, such as finding a channel usable for communication, is completed. In another embodiment, execution of the second scan can occur regardless of the outcome of the first scan, although the configuration of the second scan may be dependent upon the outcome of the first scan. More generally, embodiments of the invention provide for determining, based on the outcome of the first scan, whether to perform a second scan.

The present invention can further comprise a sequence of scans including the first scan using the first scan mode and the second scan using the second scan mode, plus additional scans such as a third scan where appropriate, wherein each subsequent scan is configured in a predetermined or adaptive manner. For example, channels can be scanned using the first scan mode, then the second scan mode, then the first scan mode, and so on until a channel with a desired attribute is found. Furthermore, each subsequent scan, or even the ordering of subsequent scans, can be configured based on the results of the previous scans. Thus, the above descriptions of the first scan and second scan can be applied to any number or sequential ordering of scanning operations.

It is to be understood that, when a sequence of scans is performed, features and embodiments of the first scan and the second scan can be interchangeable. For example, in one embodiment the second scan mode can be used to identify channels more likely or less likely to be useful for communication in the first mode, and can further configure attributes such as channel score attributes or probability score attributes for this purpose. In one embodiment, the first scan can be thus configured based on attributes assigned during previous scans. A sequence of scans can thus be executed according to one embodiment such that each scan is executed using a scan mode, the scan mode being configured according to the results of previous scans.

In one embodiment, each subsequent scan can comprise the scanning of just one channel. For example, a first scan can be performed of a first channel using the first scan mode, a second scan can be performed of a second channel using the first scan mode, a third scan can be performed of a third channel using the second scan mode, and so on until a channel with a desired attribute is found. In this embodiment, it can be easier to describe an embodiment of the invention wherein the scan mode is switched at arbitrary times.

In one embodiment, further scan modes, for example a third scan mode and a fourth scan mode, can be available for execution in further scans by a communication terminal. For example, a "tri-mode" cellular telephone can operate to scan for a home network operating one of three types of services. As with the second scan being based on the results of the first scan, scans based on the further scan modes can be configured based on the results of previous scans.

In one embodiment, the first scan mode is configured to detect UMTS networks, and the second scan mode is configured to detect GSM networks.

Apparatus for Multi-Mode Wireless Communications

The present invention involves performing at least one scan of one or more communication channels, the scan directed toward identifying one or more channels having a desired attribute. In one embodiment, an apparatus according to the present invention comprises a first scanning module and a second scanning module, operably coupled to a processing module which in part is operable to configure operation of the first and second scanning modules.

In one embodiment, an apparatus according to the present invention is provided within a cellular telephone, personal digital assistant (PDA), personal computer, or similar communication-enabled device. For example, the apparatus can be provided to facilitate connection of a cellular telephone or personal computer to a locally accessible network which might be operating in one of several modes.

In one embodiment, an apparatus according to the present invention comprises a first scanning module, wherein the first scanning module can be configured to observe aspects of one or more selected channels in response to a command in order to determine channel attributes. For example, the first scanning module can include a tuneable receiver or transceiver which can detect the amount and structure of activity on selected communication channels. The first scanning module can be further configured to differentiate channels used by predetermined types of networks. For example, a receiver can be configured to determine whether a channel is associated with a network operating in the first mode, such as GSM, or in another mode. The first scanning module can further be configured to determine whether a channel is associated with a home network operating in a predetermined mode.

In one embodiment, the first scanning module can also use a transmitter to actively interrogate a selected channel to determine attributes such as whether the selected channel is associated with a home network operating in a predetermined mode. For example, signals can be transmitted to test for a response from a network receiving information on the selected channel.

In one embodiment, the first scanning module can also determine the amount of activity or power on a selected channel. For example, a radio receiver coupled to a measurement device or rectifier, or other apparatus, can be used to measure power on a selected channel, as would be understood by a worker skilled in the art.

In another embodiment, power is determined by using statistical tests and measurements, as would be understood by a worker skilled in the art.

In one embodiment, an additional module can be provided for performing the power scan, substantially distinct from the first scanner module.

In one embodiment, an apparatus according to the present invention further comprises a second scanning module. The second scanning module can be configured to observe aspects of one or more selected channels in response to a command in order to determine channel attributes. For example, the second scanning module can include a tuneable receiver or transceiver which can detect the amount and structure of activity on selected communication channels. The second scanning module can be further configured to differentiate channels used by predetermined types of networks. For example, a receiver can be configured to determine whether a channel is associated with a network operating in the second mode, such as UMTS, or in another mode. The second scanning module can further be configured to determine whether a channel is associated with a home network operating in a predetermined mode.

In one embodiment, the second scanning module can also use a transmitter to actively interrogate a selected channel to determine attributes such as whether the selected channel is associated with a home network operating in a predetermined mode. For example, signals can be transmitted to test for a response from a network receiving information on the selected channel.

In one embodiment, an apparatus according to the present invention comprises a scanning device which can be configured to provide functionality of the first scanning module and the second scanning module. For example a transceiver can be provided which is used by both the first scanning module and the second scanning module for channel scanning activities.

Other devices can be included to support channel scanning activities as described above, as would be understood by a worker skilled in the art. For example, antennas, amplifiers, tuners, filters, correlators, signal generators, frequency synthesizers, Phase-locked loops, and the like can be provided to support obtaining channel attributes.

In one embodiment, an apparatus according to the present invention comprises two or more separate devices providing at least a portion of the different functionalities of the first scanning module and the second scanning module, respectively. For example a separate transceiver can be used by each of the first scanning module and the second scanning module.

In one embodiment, an apparatus according to the present invention comprises a processing module, operatively coupled to the first scanning module and the second scanning module, configured to direct scanning activities thereof and to collect, process, and report the outcomes of the scans, including reporting channels having a desired attribute. The processing module can also be used to configure scans, for example to periodically configure adaptive scans based on previously obtained scan results, or to configure the second scan based on the results of the first scan. The processing module can include a general purpose or dedicated computing device, including a processor, memory, FPGA, ASIC, PIC, PLD, and associated hardware such as power supply, clock, input/output controllers, user interface, and the like.

In one embodiment, the processing module is integrated into a wireless-enabled device, such as a cellular telephone, laptop, or communications card. For example, the processing module can run on shared electronics according to instructions provided by software or firmware. This can enable the present invention to be implemented in current wireless-enabled systems without substantial reconfiguration or addition of new hardware, software or firmware elements.

Other portions of the apparatus, as would be readily understood by a worker skilled in the art, can also be provided in support of the present invention. For example, the apparatus may include a user interface, rechargeable power supply, positioning system such as a GPS, one or more additional transceiver modules, and volatile or non-volatile memory for storing user preferences, roaming information, network information, and the like.

Incorporating Location Information

In one embodiment, location information, for example as obtained through a global positioning system (GPS) unit or similar device, can be used to further configure the first scan or the second scan, or both.

In one embodiment, location information can be used to configure the initial collection and range of channels to be scanned. For example, if the communication terminal is determined to be in a location where predetermined channels are more likely to be in use, the first scan and the second scan can be configured to scan such channels more thoroughly or preferentially to other channels.

In one embodiment, location information can be used to configure the desired attributes sought in a scan. For example, if the communication terminal is determined to be in a location where UMTS networks are known to be sparse or non-existent, the first scan and the second scan can be configured to search for networks other than UMTS networks. Other network types, such as GSM, can also be sought or avoided in this manner.

In one embodiment, location information can be used to initiate a channel scan under predetermined conditions. For example, as a communications terminal approaches a border such as a service region border or political border, a module having location information can trigger a first and second scan for a network having desired attributes, in anticipation of the currently used network becoming unavailable.

The invention will now be described with reference to specific examples. It will be understood that the following examples are intended to describe embodiments of the invention and are not intended to limit the invention in any way.

EXAMPLES

Example 1

In the first example, a first scan is executed using a first scan mode to identify a channel usable for communication in the first mode, if such a channel exists. The first scan is further capable of determining at least one higher priority channel more likely to be usable for communication in the second mode than at least one lower priority channel. If a channel usable for communication in the first mode is not identified, a second scan is executed using a second scan mode to identify a channel usable for communication in the second mode, if such a channel exists. The second scan is configured to scan at least one higher priority channel before at least one lower priority channel, as determined at least in part by the first scan mode. Optionally, at least one lower priority channel is not scanned in the second scan mode if it is deemed sufficiently unlikely that such a channel will not be usable for communication in the second mode. A representative algorithm illustrating execution of the first example is illustrated in FIGS. 1, 2A, 2B, 3 and 4, as described below.

FIG. 1 illustrates a method for executing a first scan according to the current example. Upon initiating the first scan at step 100, known initial conditions such as geographic location, subscriber status, etc. can be used to generate initial channel attributes at step 110. These initial attributes, if any, can be used to influence the selection of the first channel to scan in step 120. The channel selection step 120 can further rely on predetermined channel selection rules, such as scanning channels having the lowest frequency first, scanning channels in order of most recent use, or other channel selection rules as would be understood by a worker skilled in the art. Upon subsequent entries to the channel selection step 120, for example from step 160, channels which have already been scanned in the first scan may be labelled as such. In this case, these labels may be taken into account when selecting the next channel to be scanned in step 120, for example to avoid scanning the same channel multiple times. If the first scan is an adaptive scan, the attributes and labels influencing the next channel to be scanned may change as a result of previous iterations of the first scan. An illustration of a possible channel selection method is given in FIG. 4, as described below.

Once a channel is selected to be scanned in step 120, the selected channel is scanned in the first scan mode in step 130. In the present example, the first scan mode involves a determination of the power due to electromagnetic radiation at the radio frequencies of the channel. The first scan mode can also include a determination of whether a network is operating on the selected channel in the first mode, for example a GSM network. According to one embodiment of the present invention, this determination can be performed unconditionally; according to another embodiment, this determination can be performed on the condition that the power on the channel is determined to be above a prespecified level. The first scan mode can further include a determination of whether a home network is operating on the selected channel in the first mode, for example a home GSM network. According to one embodiment of the present invention, this determination can be performed unconditionally; according to another embodiment, this determination can be performed on the condition that a network is operating on the selected channel in the first mode. The results of the scan in step 130 are relevant to the execution of subsequent steps.

Following the channel scan in the first scan mode, a determination is made in step 140 of whether the selected channel has a desired attribute, in the present example the desired attribute being whether a home network is operating on the selected channel in the first mode. If there is such a desired attribute, a final update of channel attributes can be performed, a connection to the network can be established in step 145 and the scanning operation can be terminated. Otherwise, the channel attributes are updated in step 150 and the scan may possibly continue. Channel attributes updated include an indicator of the radio activity or power on a channel or on a cluster of nearby channels, whether a network operating in the first mode is present, whether a home network is present, and a determination of the scan priority for a channel in future scanning operations. In addition to updating the attributes of the channel just scanned in step 130, attributes of other nearby channels can also be updated in steps 145 and 150. An illustration of a possible channel attribute update method is given in FIGS. 2A and 2B, as described below.

After updating channel attributes in step 150, a determination is made in steps 160 and 170 regarding whether to continue the first scan, proceed to the second scan, or terminate the scan. This determination can be made accounting for the current channel attributes and other labels assigned to channels. For example, if all channels have been scanned at least once and no home network has been found operating in the first mode, the first scan may be ended. In an adaptive scan, if the channels have been scanned sufficiently that there is low likelihood of finding a network operating in the first mode, the first scan may be ended. Otherwise, the first scan may be continued by selecting a new channel to be scanned in step 120. If the first scan is not continued, the second scan may be initiated. In one embodiment, the second scan is initiated unconditionally after the first scan; in another embodiment, the second scan may be initiated if the attributes, for example the channel activity or power, indicate that there is sufficient likelihood of finding a channel operating in the second mode based on the second scan. An illustration of a possible second scan method is given in FIG. 3, as described below.

Figure 2A:
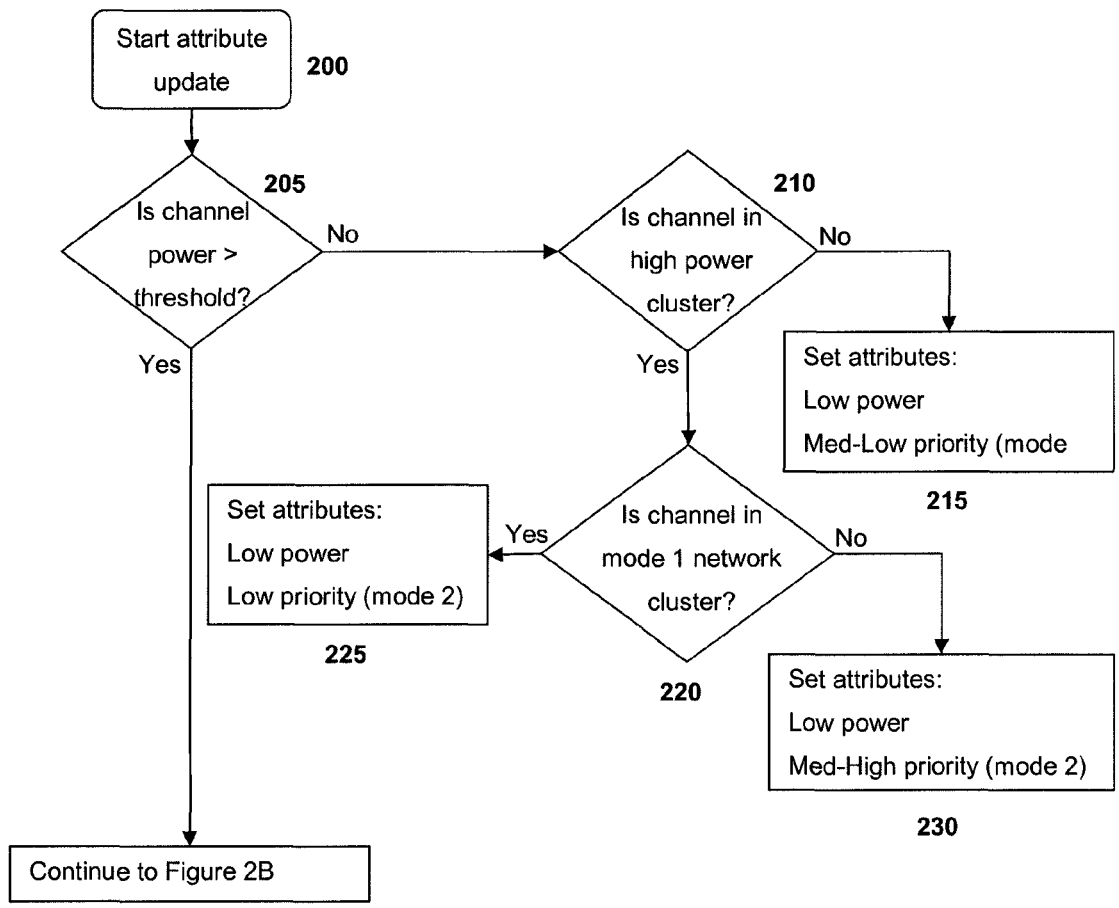
FIGS. 2A and 2B illustrate a method for updating channel attributes during the first scan mode, including attributes influencing the selection and ordering of channels to be scanned during the second scan mode, according to one embodiment of the present invention.
Figure 2B:
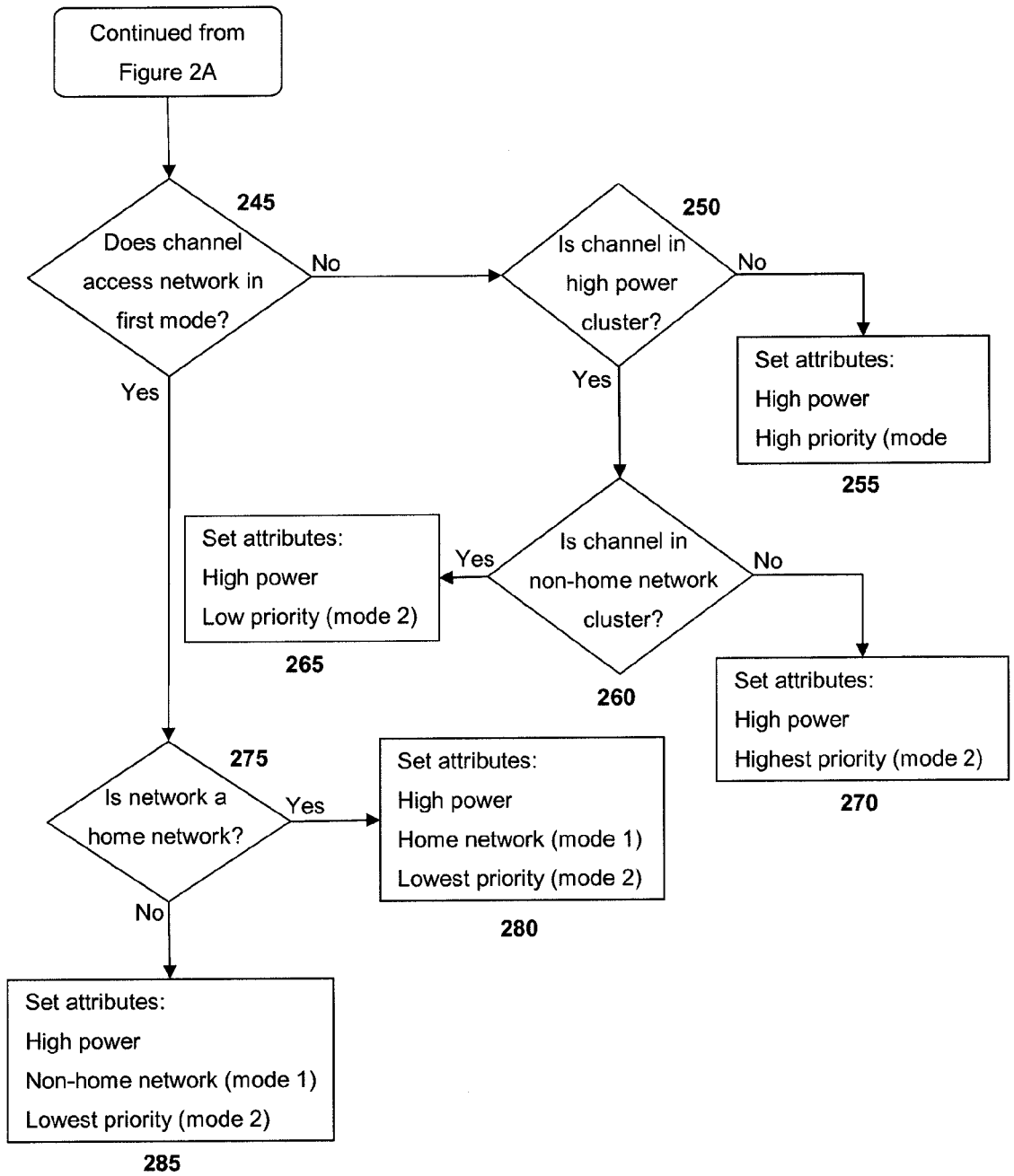

FIGS. 2A and 2B illustrate a method for updating channel attributes during the first scan mode, corresponding to step 130 in FIG. 1. This includes updating attributes influencing the selection and ordering of channels to be scanned during the second scan mode. Upon initialization of the attribute update in step 200, a determination 205 is made of whether or not radio power or activity on the selected channel, determined in the first scan mode, exceeds a prespecified threshold. If the channel power or activity is below the predetermined threshold, a further determination 210 is made of whether or not the channel is in a high power cluster, as determined by the radio power or activity on channels near the selected channel. If the channel is determined as not being in a high power cluster, the channel is assigned attributes in step 215 of being both low power, and having medium to low priority for purposes of scanning in the second scan. If the channel is determined as being in a high power cluster, a further determination 220 is made of whether or not a predetermined number of nearby channels are associated with a network operating in the first mode. If a sufficient number of nearby channels are associated with a network operating in the first mode, the channel is assigned attributes in step 225 of being both low power, and having low priority for purposes of scanning in the second scan. Otherwise, if an insufficient number of nearby channels are associated with a network operating in the first mode, the channel is assigned attributes in step 230 of being both low power, and having medium to high priority for purposes of scanning in the second scan.

If the selected channel power or activity is above the predetermined threshold in step 205, a further determination 245 (FIG. 2B) is made as to whether the selected channel is associated with a network operating in the first mode, for example a GSM network. If the channel is not associated with such a network, a further determination 250 is made of whether or not the channel is in a high power cluster, as determined by the radio power or activity on channels near the selected channel. If the channel is determined as not being in a high power cluster, the channel is assigned attributes in step 255 of being both high power, and having high priority for purposes of scanning in the second scan. If the channel is determined as being in a high power cluster, a further determination 260 is made of whether or not a predetermined number of nearby channels are associated with a non-home network operating in the first mode. If a sufficient number of nearby channels are associated with a non-home network operating in the first mode, the channel is assigned attributes in step 265 of being both high power, and having low priority for purposes of scanning in the second scan. Otherwise, if an insufficient number of nearby channels are associated with a non-home network operating in the first mode, the channel is assigned attributes in step 270 of being both high power, and having highest priority for purposes of scanning in the second scan.

If the determination 245 reveals that the selected channel is associated with a network operating in the first mode, a further determination 275 is made as to whether the network is a home network. If it is a home network, the channel is assigned attributes in step 280 of being high power, being associated with a home network in the first mode and therefore usable for connection to the home network, and having lowest priority for purposes of a future second scans, if forthcoming. Under these conditions the scan may terminate, since a home network has been found. If the network is not a home network, the channel is assigned attributes in step 285 of being high power, being associated with a non-home network in the first mode, and having lowest priority for purposes of the second scan.

Figure 3:
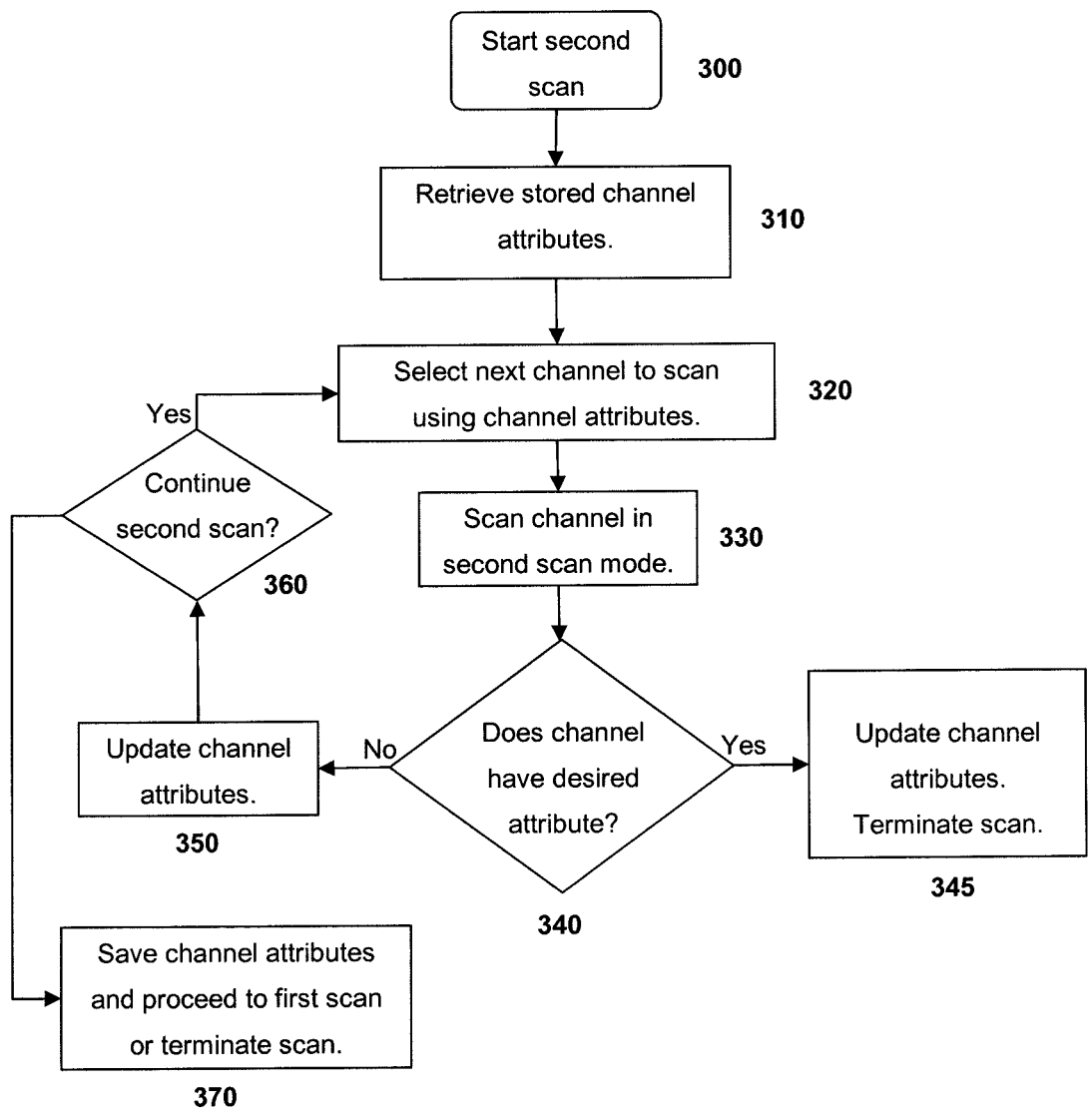
FIG. 3 illustrates a method for executing a second scan for a network operating in a second mode according to one embodiment of the present invention.

FIG. 3 illustrates a method for executing a second scan for a network operating in a second mode according to the current example. Upon initiating the second scan at step 300, the stored channel attributes determined during the first scan, along with known initial conditions such as geographic location, subscriber status, etc. are retrieved at step 310. These retrieved channel attributes can be used to influence the selection of the first channel to scan in step 320. For example, higher priority channels, as determined as illustrated in FIGS. 2A and 2B can be scanned before lower priority channels. The channel selection step 320 can further rely on predetermined channel selection rules, such as scanning channels having the lowest frequency first, scanning channels in order of most recent use, scanning higher power or higher activity channels first, or other channel selection rules as would be understood by a worker skilled in the art. Upon subsequent entries to the channel selection step 320, for example from step 360, channels which have already been scanned in the second scan may be labelled as such. In this case, these labels may be taken into account when selecting the next channel to be scanned in step 320, for example to avoid scanning the same channel multiple times. If the second scan is an adaptive scan, the attributes and labels influencing the next channel to be scanned may change as a result of previous iterations of the second scan. An illustration of a possible channel selection method is given in FIG. 4, as described below.

Once a channel is selected to be scanned in step 320, the selected channel is scanned in the second scan mode in step 330. In the present example, the second scan mode involves a determination of the power due to electromagnetic radiation at the radio frequencies of the channel. The second scan mode can also include a determination of whether a network is operating on the selected channel in the second mode, for example a UMTS network. According to one embodiment of the present invention, this determination can be performed unconditionally; according to another embodiment, this determination can be performed on the condition that the power on the channel is determined to be above a prespecified level. The second scan mode can further include a determination of whether a home network is operating on the selected channel in the second mode, for example a home UMTS network. According to one embodiment of the present invention, this determination can be performed unconditionally; according to another embodiment, this determination can be performed on the condition that a network is operating on the selected channel in the second mode. The results of the scan in step 330 are relevant to the execution of subsequent steps.

Following the channel scan in the second scan mode, a determination is made in step 340 of whether the selected channel has a desired attribute, in the present example the desired attribute being whether a home network is operating on the selected channel in the second mode. If there is such a desired attribute, a final update of channel attributes can be performed, a connection to the network can be established in step 345 and the scanning operation can be terminated. Otherwise, the channel attributes are updated in step 350 and the scan may possibly continue. Channel attributes updated include an indicator of the radio activity or power on a channel or on a cluster of nearby channels, whether a network operating in the second mode is present, whether a home network is present, and a determination of the scan priority for a channel in future scanning operations. In addition to updating the attributes of the channel just scanned in step 330, attributes of other nearby channels can also be updated in steps 345 and 350.

After updating channel attributes in step 350, a determination is made in steps 360 and 370 regarding whether to continue the second scan, proceed to the first scan, or terminate the scan. This determination can be made accounting for the current channel attributes and other labels assigned to channels. For example, if all channels have been scanned at least once and no home network has been found operating in the second mode, the second scan may be ended. In an adaptive scan, if the channels have been scanned sufficiently that there is low likelihood of finding a network operating in the second mode, the second scan may be ended. Otherwise, the second scan may be continued by selecting a new channel to be scanned in step 320. If the second scan is not continued, the first scan may be re-initiated. In one embodiment, the first scan is re-initiated unconditionally after the second scan; in another embodiment, the first scan may be re-initiated if the attributes, for example the channel activity or power, indicate that there is sufficient likelihood of finding a channel operating in the first mode based on the first scan.

Figure 4:
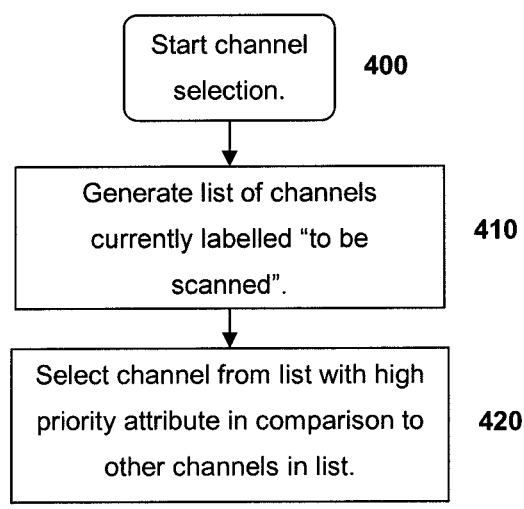
FIG. 4 illustrates a method for selecting the next channel to be scanned during the first scan mode or the second scan mode according to one embodiment of the present invention.

FIG. 4 illustrates a method for selecting the next channel to be scanned during the first scan mode or the second scan mode according to the current example. Upon initiating the channel selection in step 400, a list of channels is generated in step 410 of channels having label "to be scanned," indicating that the channel has not yet been scanned, or in the case of an adaptive scan, that the channel is to be scanned in the future. Of these channels, a relatively high priority channel is selected in step 420 for scanning in the current scan mode. In this manner, higher priority channels are scanned before lower priority channels.

Example 2

Figure 5:
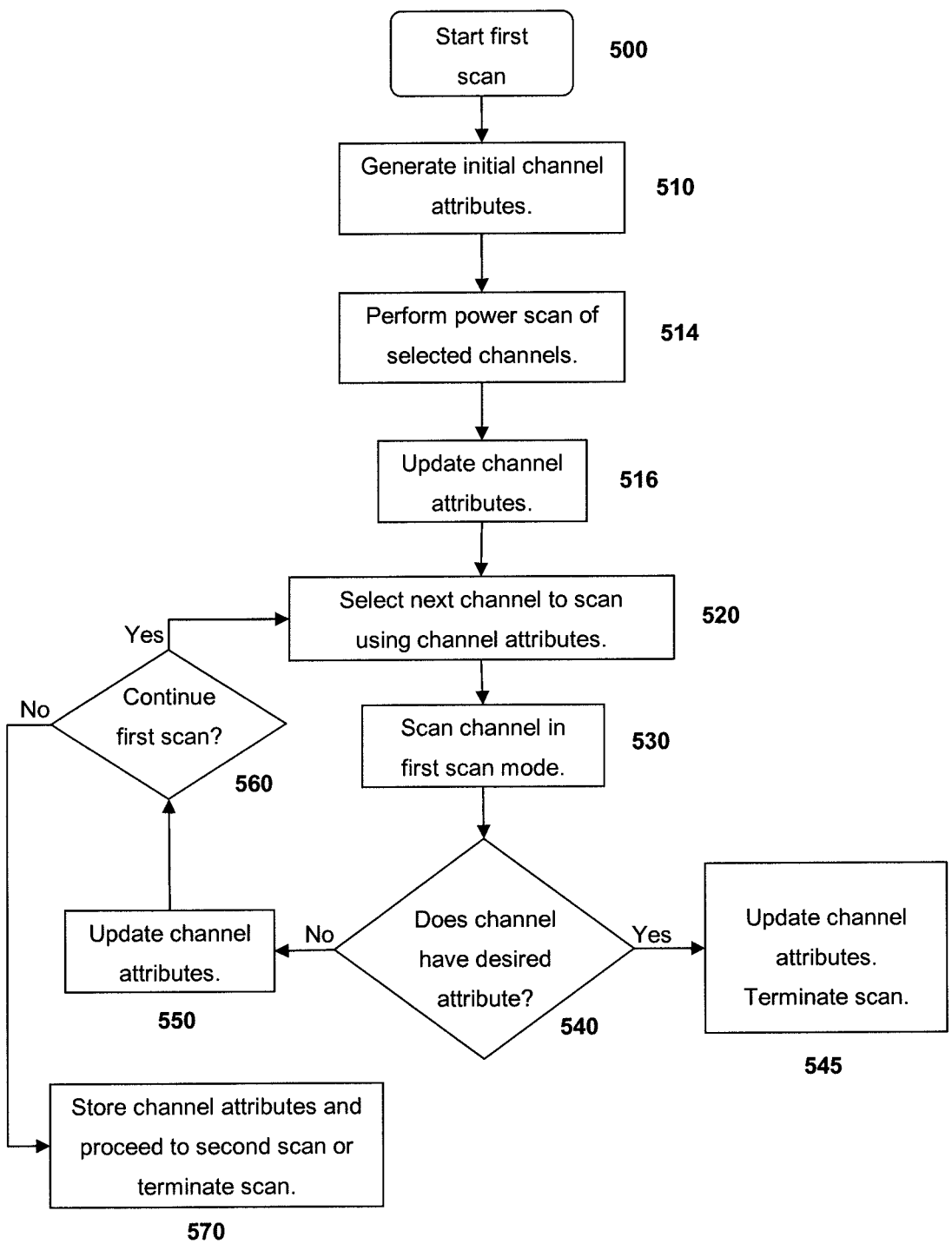
FIG. 5 illustrates an alternative method for executing a first scan for a network operating in a first mode according to one embodiment of the present invention.

FIG. 5 illustrates an alternative method to the method described in FIG. 1 for executing a first scan. In this method, a power scan of selected channels is performed to determine the amount of radio power or activity in a portion of the radio spectrum, the power scan being completed before the first scan mode is executed. Upon initiating the first scan at step 500, known initial conditions such as geographic location, subscriber status, etc. can be used to generate initial channel attributes at step 510. These initial attributes, if any, can be used to influence the selection of channels to be scanned using a power scan in step 514. The power scan involves a determination of the power due to electromagnetic radiation at the radio frequencies of the channel. In one embodiment, the power scan is an adaptive scan. The results of the power scan can be used to update channel attributes in step 516, such as attributes indicative of the amount of power on each channel, and whether a channel falls in a cluster of channels having power above a predetermined threshold. These updated attributes can be used to influence the selection of the first channel to scan using the first scan mode in step 520. The channel selection step 520 can further rely on predetermined channel selection rules, such as scanning channels having the lowest frequency first, scanning channels in order of most recent use, scanning channels having power above a predetermined threshold or which fall near a cluster of channels having power above a predetermined threshold, or other channel selection rules as would be understood by a worker skilled in the art. Upon subsequent entries to the channel selection step 520, for example from step 560, channels which have already been scanned in the first scan may be labelled as such. In this case, these labels may be taken into account when selecting the next channel to be scanned in step 520, for example to avoid scanning the same channel multiple times. If the first scan is an adaptive scan, the attributes and labels influencing the next channel to be scanned may change as a result of previous iterations of the first scan. An illustration of a possible channel selection method is given in FIG. 4, as described above.

Once a channel is selected to be scanned in step 520, the selected channel is scanned in the first scan mode in step 530. In the present example, the first scan mode involves a determination of whether a network is operating on the selected channel in the first mode, for example a GSM network. The first scan mode can further include a determination of whether a home network is operating on the selected channel in the first mode, for example a home GSM network. According to one embodiment of the present invention, this determination can be performed unconditionally; according to another embodiment, this determination can be performed on the condition that a network is operating on the selected channel in the first mode. The results of the scan in step 530 are relevant to the execution of subsequent steps.

Following the channel scan in the first scan mode, a determination is made in step 540 of whether the selected channel has a desired attribute, in the present example the desired attribute being whether a home network is operating on the selected channel in the first mode. If there is such a desired attribute, a final update of channel attributes can be performed, a connection to the network can be established in step 545 and the scanning operation can be terminated. Otherwise, the channel attributes are updated in step 550 and the scan may possibly continue. Channel attributes updated include an indicator of the radio activity or power on a channel or on a cluster of nearby channels, whether a network operating in the first mode is present, whether a home network is present, and a determination of the scan priority for a channel in future scanning operations. In addition to updating the attributes of the channel just scanned in step 530, attributes of other nearby channels can also be updated in steps 545 and 550. An illustration of a possible channel attribute update method is given in FIGS. 2A and 2B, as described above.

After updating channel attributes in step 550, a determination is made in steps 560 and 570 regarding whether to continue the first scan, proceed to the second scan, or terminate the scan. This determination can be made accounting for the current channel attributes and other labels assigned to channels. For example, if all channels have been scanned at least once and no home network has been found operating in the first mode, the first scan may be ended. In an adaptive scan, if the channels have been scanned sufficiently that there is low likelihood of finding a network operating in the first mode, the first scan may be ended. Otherwise, the first scan may be continued by selecting a new channel to be scanned in step 520. If the first scan is not continued, the second scan may be initiated. In one embodiment, the second scan is initiated unconditionally after the first scan; in another embodiment, the second scan may be initiated if the attributes, for example the channel activity or power, indicate that there is sufficient likelihood of finding a channel operating in the second mode based on the second scan. An illustration of a possible second scan method is given in FIG. 3, as described above.

Example 3

Figure 6:
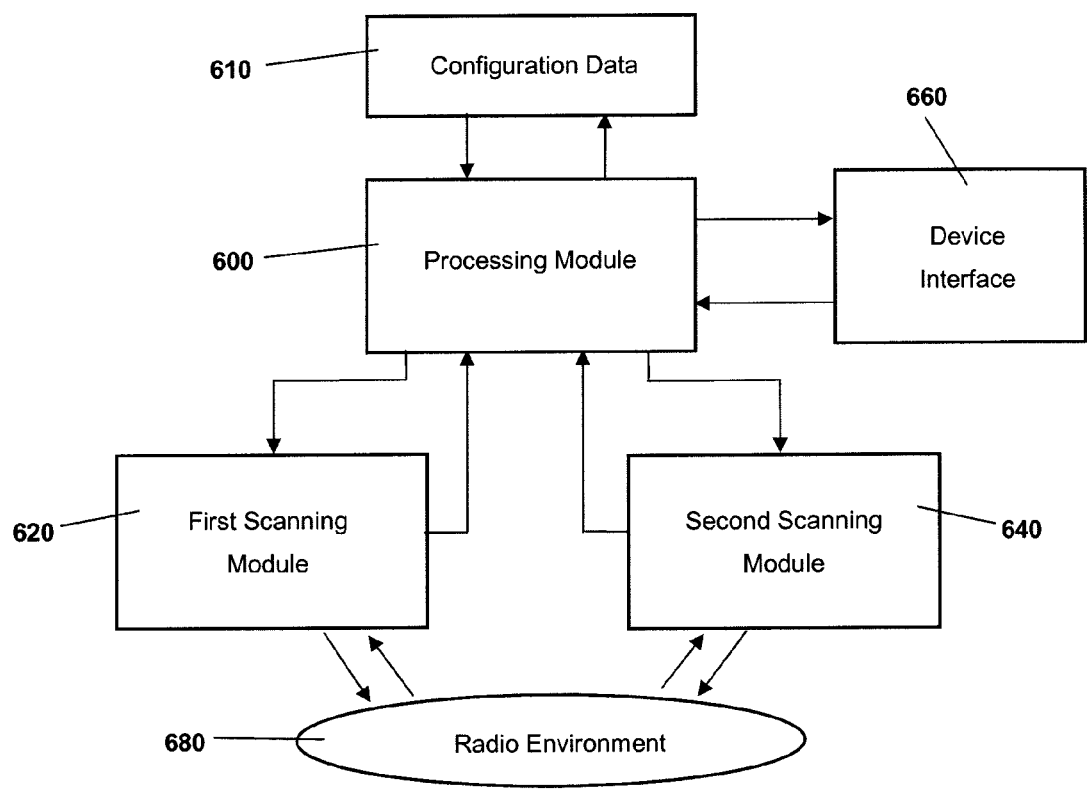
FIG. 6 illustrates an apparatus for scanning channels according to an embodiment of the present invention.

FIG. 6 illustrates an apparatus for scanning channels according to an embodiment of the present invention. The apparatus comprises a processing module 600 operatively coupled to a first scanning module 620 and to a second scanning module 640. The processing module 600 is also adapted to read and write configuration data 610, and to interact with a device interface 660 for configuring communications and other operations. The first scanning module 620 and the second scanning module 640 both interact with an external radio environment 680 to perform scanning operations as directed by the processing module 600. The above can be embedded in a device such as a wireless network card or a cellular communication terminal.

The processing module 600 is a general purpose or application specific electronic computing device configured to manage scanning activities and report the scan results. The processing module 600 can receive configuration data 610 such as user interface data, stored information, location information, etc. The configuration data 610 can be of relevance to the scan, for example by specifying what types of networks may be present and the likelihoods of discovering a particular network on a particular channel. Other information, such as an indication of the amount of power or time to be spent on scans, can also be included. The processor directs the first scanning module 620 and the second scanning module 640 to perform channel scans, as described previously, and receives the results of these scans, for example the attributes determined by the scans. Further attributes can be computed by the processing module 600 as required. The processing module can also include a data interface with a device interface 660 for example for utilizing the results of the scans. For example, the specification of a channel having a desired attribute can be passed to the device interface for subsequent use in connecting and communicating with a network such as a home network.

The first scanning module 620 includes a device capable of interfacing with a selectable wireless communication channel or plurality of wireless communication channels in the radio environment 680. The first scanning module includes a tuneable wireless transceiver and is capable of obtaining information, for example channel attributes, about the wireless environment through scanning activities. The first scanning module 620 can also execute a power scan in one embodiment. The first scanning module accepts instructions regarding which channels to scan and how to perform each scan from the processing module 600. The first scanning module returns information, for example channel attributes, back to the processing module 600 as the scan progresses.

The second scanning module 640 includes a device capable of interfacing with a selectable wireless communication channel or plurality of wireless communication channels in the radio environment 680. The second scanning module includes a tuneable wireless transceiver and is capable of obtaining information, for example channel attributes, about the wireless environment through scanning activities. The second scanning module accepts instructions regarding which channels to scan and how to perform each scan from the processing module 600. The second scanning module returns information, for example channel attributes, back to the processing module 600 as the scan progresses.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

In addition, while the above discusses the invention as it can be implemented using a generic OS and/or generic hardware, it is within the scope of the present invention that the method, apparatus and computer program product of the invention can equally be implemented to operate using a non-generic OS and/or can use non-generic hardware.

Further, each step of the method may be executed on any general computer, such as a personal computer, server or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method of scanning a plurality of communication channels and identifying one or more communication channels having a desired attribute, the method comprising:
   a) performing a first scan of a first set of two or more of the plurality of communication channels using a first scan mode, the first scan mode determining an indication of whether each of the first set of communication channels is associated with a network operating, in a first communication mode;
   b) assigning one or more attributes to at least one of the plurality of communication channels depending on the first scan, the one or more attributes selected from a set of potential attributes including the desired attribute, at least one of the one or more attributes conveying partial information indicative of a likelihood that a corresponding communication channel of the plurality of communication channels is usable for communication in a second communication mode different from the first communication mode;
   c) determining, based on the assigned attributes, whether to perform a second scan of a second set of one or more of the plurality of communication channels using a second scan mode, the second scan mode determining an indication of whether each of the second set of communication channels is associated with a network operating in the second communication mode;

d) performing, if required, said second scan, the second scan configured based at least in part on the assigned attributes;

e) assigning one or more additional attributes to at least one of the plurality of communication channels depending on the second scan, the one or more additional attributes selected from the set of potential attributes including the desired attribute; and f) identifying at least one of said one or more of the plurality of communication channels having the desired attribute if one or more of the plurality of communication channels are assigned the desired attribute based on the first scan or the second scan, wherein each of the first communication mode and the second communication mode correspond to different, incompatible wireless communication standards, wherein determining whether to perform the second scan includes determining how many of the plurality of communication channels are assigned the desired attribute based on the first scan, and wherein the second scan is performed if none of the plurality of communication channels are assigned the desired attribute based on the first scan.

2. The method of claim 1, wherein the desired attribute is indicative that the communication channel to which the desired attribute is assigned is usable for communication with a home network operating in the first communication mode or the second communication mode.

3. The method of claim 1, wherein the set of potential attributes includes attributes indicative of one or more properties of the communication channel to which the attribute is assigned, said one or more properties selected from the group comprising: radio activity on the communication channel, radio activity on one or more radio frequencies near the communication channel, radio activity on one or more frequencies related to the communication channel, a network operating in the first communication mode on the communication channel, the communication channel usable for communication with a home network operating in the first communication mode, a network operating in the second communication mode on the communication channel, and the communication channel usable for communication with a home network operating in the second communication mode.

4. The method of claim 1, wherein the first communication mode is selected from the group comprising: UMTS and GSM.

5. The method of claim 1, wherein the second communication mode is selected from the group comprising: UMTS and GSM.

6. The method of claim 1, wherein at least one of the first scan and the second scan is an adaptive scan.

7. The method of claim 1, wherein the one or more attributes assigned during the first scan are indicative of an order in which communication channels are scanned during the second scan.

8. The method of claim 1, wherein the one or more attributes assigned during the first scan are indicative of one or more probabilities that communication channels to which said one or more attributes are assigned will be assigned the desired attribute during the second scan.

9. The method of claim 1, wherein the one or more attributes assigned during the first scan are associated with one or more priority levels, wherein at least one communication channel associated with a higher priority level is scanned during the second scan before at least one communication channel associated with a lower priority level.

10. The method of claim 9, wherein the second scan terminates before scanning at least one communication channel associated with a lower priority level.

11. The method of claim 1, further comprising performing one or more subsequent scans configured at least in part based on the one or more attributes assigned during the first scan and the one or more additional attributes assigned during the second scan.

12. The method of claim 1, wherein the first scan is selected from the group comprising: active scans and passive scans.

13. The method of claim 1, wherein the second scan is elected from the group comprising: active scans and passive scans.

14. The method of claim 1, further comprising configuring one or more of the first scan and the second scan according to location information.

15. A non-transitory computer readable medium having recorded thereon statements and instructions for execution by a computer to carry out the method of claim 1.

16. A method of scanning a plurality of communication channels to identify one or more communication channels having a desired attribute, the method comprising scanning two or more of the plurality of communication channels using two or more scan modes, wherein information acquired during one scan mode is used to configure a subsequent scan mode, said one scan mode determining an indication of whether each of a first set of two or more communication channels is associated with a network operating in a first communication mode, said one scan mode further determining an indication of partial information indicative of a likelihood that a corresponding communication channel of the plurality of communication channels is usable for communication in a second communication mode different from the first communication mode, and said subsequent scan mode determining an indication of whether each of a second set of one or more communication channels is associated with a network operating in the second communication mode, wherein each of the first communication mode and the second communication mode correspond to different, incompatible wireless communication standards, wherein determining an indication of whether each of a second set of one or more communication channels is associated with a network operating in the second communication mode includes determining how many of the plurality of communication channels are assigned a desired attribute based on the first scan mode, and wherein the subsequent scan mode is performed if none of the plurality of communication channels are assigned the desired attribute in the first scan mode.

17. A non-transitory computer readable medium having recorded thereon statements and instructions for execution by a computer to carry out the method of claim 16.

18. An apparatus for scanning a plurality of communication channels and identifying one or more communication channels having a desired attribute, the apparatus capable of multi-mode communication and comprising:

a) a first scanning module configured to perform a first scan of a first set of two or more of the plurality of communication channels using a first scan mode, the first scan mode determining an indication of whether each of the first set of communication channels is associated with a network operating in a first communication mode;

b) a second scanning module configured to perform a second scan of a second set of one or more of the plurality of communication channels using a second scan mode, the second scan mode determining an indication of whether each of the second set of communication channels is associated with a network operating in a second communication mode different from the first communication mode; and c) a processing module configured to:
  i) initiate the first scanning module to perform the first scan, the processing module configured to assign one or more attributes to at least one of the plurality of communication channels depending on the first scan, the one or more attributes selected from a set of potential attributes including the desired attribute, at least one of the one or more attributes conveying partial information indicative of a likelihood that a corresponding communication channel of the plurality of communication channels is usable for communication in the second communication mode;
  ii) determine, based on the assigned attributes, whether to perform the second scan;
  iii) initiate, if required, the second scanning module to perform the second scan;
  iv) configure the second scan based at least in part on the assigned attributes;
  v) assign one or more additional attributes to at least one of the plurality of communication channels depending on the second scan, the one or more additional attributes selected from the set of potential attributes including the desired attribute; and
  vi) identify at least one of said one or more of the plurality of communication channels having the desired attribute if one or more of the plurality of communication channels are assigned the desired attribute based on the first scan or the second scan, wherein each of the first communication mode and the second communication mode correspond to different, incompatible wireless communication standards, wherein determining whether to perform the second scan includes determining how many of the plurality of communication channels are assigned the desired attribute based on the first scan, and wherein the second scan is performed if none of the plurality of communication channels are assigned the desired attribute based on the first scan.

19. The apparatus of claim 18, wherein the first scanning module and the second scanning module have a common portion.

20. The apparatus of claim 18, wherein the apparatus is operatively coupled to a device selected from the group comprising: cellular telephones, personal digital assistants, and personal computers.

21. The apparatus of claim 18, wherein the desired attribute is indicative that the communication channel to which the desired attribute is assigned is usable for come in the first communication mode or the second communication mode.

22. The apparatus of claim 18, wherein the set of potential attributes includes attributes indicative of one or more properties of the communication channel to which the attribute is assigned, said one or more properties selected from the group comprising: radio activity on the communication channel, radio activity on one or more radio frequencies near the communication channel, radio activity on one or more frequencies related to the communication channel, a network operating in the first communication mode on the communication channel, a home network operating in the first communication mode on the communication channel, a network operating in the second communication mode on the communication channel, and a home network operating in the second communication mode on the communication channel.

23. The apparatus of claim 18, wherein the first communication mode is selected from the group comprising: UMTS and GSM.

24. The apparatus of claim 18, wherein the second communication mode is selected from the group comprising: UMTS and GSM.

25. The apparatus of claim 18, wherein at least one of the first scan and the second scan is an adaptive scan.

26. The apparatus of claim 18, wherein the one or more attributes assigned during the first scan are indicative of an order in which communication channels are scanned during the second scan.

27. The apparatus of claim 18, wherein the one or more attributes assigned during the first scan are indicative of one or more probabilities that communication channels to which said one or more attributes are assigned will be assigned the desired attribute during the second scan.

28. The apparatus of claim 18, wherein the one or more attributes assigned during the first scan are associated with one or more priority levels, wherein at least one communication channel associated with a higher priority level is scanned during the second scan before at least one communication channel associated with a lower priority level.

29. The apparatus of claim 28, wherein the second scan terminates before scanning at least one communication channel associated with a lower priority level.

30. The apparatus of claim 18, further comprising one or more subsequent scans configured at least in part based on the one or more attributes assigned during the first scan and the one or more additional attributes assigned during the second scan.

31. The apparatus of claim 18, wherein the first scan is selected from the group comprising: active scans and passive scans.

32. The apparatus of claim 18, wherein the second scan is selected from the group comprising: active scans and passive scans.

33. The apparatus of claim 18, further comprising configuring one or more of the first scan and the second scan according to location information.

34. An apparatus for scanning a plurality of communication channels to identify one or more communication channels having a desired attribute, the apparatus capable of multimode communication and configured to scan two or more of the plurality of communication channels using two or more scan modes, wherein information acquired during one scan mode is used to configure a subsequent scan mode, said one scan mode determining an indication of whether each of a first set two or more of communication channels is associated with a network operating in a first communication mode, said one scan mode further determining an indication of partial information indicative of a likelihood that a corresponding communication channel of the plurality of communication channels is usable for communication in a second communication mode different from the first communication mode, and said subsequent scan mode determining an indication of whether each of a second set of one or more communication channels is associated with a network operating in a second communication mode, wherein each of the first communication mode and the second communication mode correspond to different, incompatible wireless communication standards, wherein determining an indication of whether each of a second set of one or more communication channels is associated with a network operating in the second communication mode includes determining how many of the plurality of communication channels are assigned a desired attribute based on the first scan mode, and wherein the subsequent scan mode is performed if none of the plurality of communication channels are assigned the desired attribute in the first scan mode.

* * * * *